United States Patent [19]
Burgis

[11] Patent Number: 4,808,830
[45] Date of Patent: Feb. 28, 1989

[54] INFRARED BEAM PROJECTOR

[76] Inventor: Warren Burgis, 8646 - 11th Avenue, Burnaby, British Columbia, Canada, V3N 2P8

[21] Appl. No.: 61,662

[22] Filed: Jun. 15, 1987

[51] Int. Cl.$^4$ .............................................. G02B 5/00
[52] U.S. Cl. ............................... 250/505.1; 250/445.1
[58] Field of Search ............. 250/494.1, 495.1, 504 R, 250/505.1; 350/96.1

[56] References Cited

U.S. PATENT DOCUMENTS

| 3,543,384 | 12/1970 | Hansen | 250/505.1 X |
| 4,233,493 | 11/1980 | Nath | 350/96.1 X |
| 4,575,181 | 3/1986 | Ishikawa | 350/96.33 X |

FOREIGN PATENT DOCUMENTS 0215601 12/1983 Japan .............................. 250/505.1

Primary Examiner—Eugene R. Laroche
Assistant Examiner—Steven J. Mottola
Attorney, Agent, or Firm—Fetherstonhaugh & Co.

[57] ABSTRACT

An infrared beam shaper able to emit a beam of infrared light having a specified shape within a predetermined distance is disclosed. It is comprised of a cluster of hollow cylindrical tubes, a source positioned at a first end of each tube and an aperture located at a second end of each tube. Each tube is positioned in the cluster arrangement with their apertures located adjacent each other and each tube has a light absorbing liner extending along each tube from the first end to the second end. Most light emitted by the source which diverges away from the central horizontal axis defined by the tube before the second end will be absorbed by the liner and any remaining light will be emitted through the aperture.

18 Claims, 1 Drawing Sheet

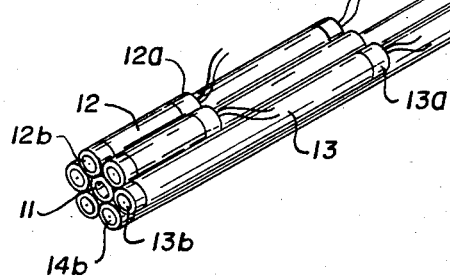
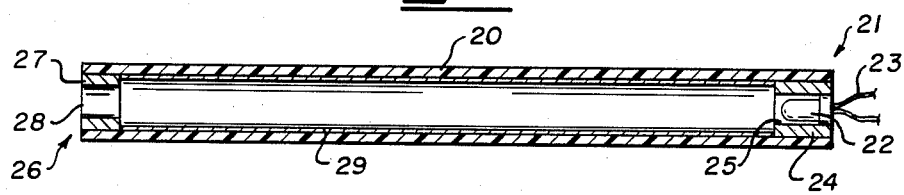
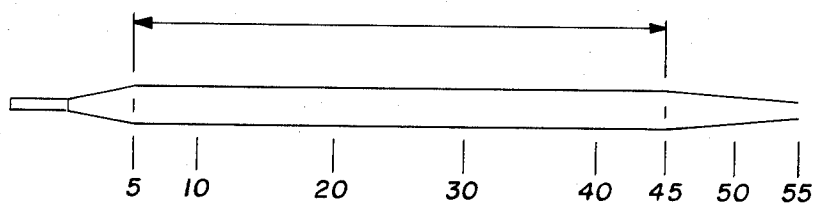

INFRARED BEAM PROJECTOR

FIELD OF THE INVENTION

This invention relates to an infrared emittors and receivers and more particularly to an infrared beam shaper.

DESCRIPTION OF THE PRIOR ART

Emittors of infrared light along with infrared receivers have long been used in a number of applications. For example, various audio and video remote controls use infrared light as a means for controlling a main unit. These remote controls are found and used for operating and controlling televisions, video records, garage door openers, toy games, etc.

However, the overall aiming capability of the emittors in most of these applications is fairly limited, since the density and accuracy of the beam deteriorates with the distance. In most applications, a photo diode detector receiver circuit will only turn on when it receives a certain minimum intensity of infrared radiation. Accordingly, most remote control emittors are usable for only a short range from the detector since the energy emitted from the source will diverge and the useful power output will decrease substantially as the distance increases.

This is due to the fact that energy from a point source of sound or light emitting harmonic waves in three dimensions will spread out equally in all directions. At a distance R from the source, the energy is uniformly distributed on a sphere of area $4\pi R^2$. The intensity (average energy per unit area per unit time) thus decreases as $1/R^2$. That is, the intensity of say a infrared light beam, decreases in intensity by one over the square of the distance from the source.

There is therefore a requirement for an infrared beam projector or shaper which is able to project a beam over a defined range, which the projected beam of infrared light has a constant minimum intensity over a defined range.

SUMMARY OF THE INVENTION

It is therefore an object of the present invention to provide an infrared beam shaper which is able to project over a defined range, a shaped beam (e.g. cylindrical) of infrared light having a constant minimum intensity over the pre-defined range (intensity within the beam varies from minimum to greater than minimum).

Yet another object of the present invention is to provide an infrared beam shaper in which most diverging light emitted from a source in the shaper will be absorbed and a smaller beam angle of diverging light will be emitted from the beam shaper.

Accordingly, it is an aspect of the present invention to provide a light beam projector, comprising:
a hollow cylindrical tube;
a light source positioned one end of said tube; and
an aperture located at the opposite end of said tube, said tube having a light absorbing liner extending along said tube from said light source to said aperture, such that most light emitted by said light source which generally diverges away from a central horizontal axis defined by said tube, before said aperture, will be absorbed by said liner and any remaining light will be emitted through said aperture.

According to a second aspect of the present invention, there is provided a light beam shaper able to project a beam of light having a specified shape as desired within a predetermined distance, comprising:
a cluster of hollow cylindrical tubes;
a light source positioned at a first end of each tube; and
an aperture located at a second end of each tube, opposite said first end, each tube being positioned in said cluster with their apertures located adjacent each other and each tube having a light absorbing liner extending along each tube from first end to said second end, such that most light emitted by said source which diverges away from a central horizontal axis defined by said tube, before said second end, will be absorbed by said liner and any remaining [non-diverging]light will be emitted through said apertures.

DESCRIPTION OF THE DRAWINGS

Particular embodiments of the invention will be understood in conjunction with the accompanied drawings in which:

FIG. 1 is a perspective view of one embodiment of the infrared beam projector of the present invention;

FIG. 2 is a sectional view of a tube shown in FIG. 1; and

FIG. 3 is an illustrative diagram of a typical light beam created by a projector of the present invention.

DESCRIPTION OF THE PREFERRED EMBODIMENTS

Referring now to FIG. 1, we have shown generally at reference numeral 10, the basic configuration of the infrared beam projector of the present invention. The projector is comprised of three pairs of cylindrical acrylic plastic tubes fastened to a frame tube 11 in a circular cluster. This cluster is comprised of a series of pairs of tubes having varying lengths adapted to emit short, medium and long range light beams. Short tubes 12 will emit a light beam having a relatively short range, medium length tubes 13 will emit a light beam having a medium range and long tubes 14 will emit a beam having a longest range. Each type of tube is arranged in pairs around frame tube 11, to form a cluster arrangement.

Tubes 12, 13 and 14 are provided with a light source 12A, 13A and 14A located at one end of the tubes. Similarly, tubes 12, 13 and 14 are provided with apertures 12B, 13B and 14B respectively. These tubes are positioned in a circular cluster arrangement with their apertures located adjacent to each other.

Referring now to FIG. 2, we have shown a cross-sectional view of a tube used in the cluster arrangement of FIG. 1. Each tube is comprised of a hollow cylindrical body 20. This body can consist of an acrylic plastic tube or other similar material. A light source 21 is located at a first end of body 20 and includes a light emitting diode 22 having connecting leads 23. Light emitting diode 22 is attached to body 20 by means of a cylindrical shaped insert 24 having a cavity 25 adapted to receive the light emitting diode 22. Located at its second end, opposite the first end, is an aperture 26. Aperture 26 is comprised of a hollow cylindrical insert 27 having a predetermined interior diameter 28 forming a light aperture. Cylindrical insert 27 is adapted to be fixedly mounted in tube 20.

A light absorbing liner 29 is positioned on the interior surface of tube 20. Liner 29 extends entirely within the interior surface of tube 20 from light source 21 to aperture 26. This light absorbing liner can be comprised of a rolled piece of black flock paper. Liner 29 is adapted to absorb most light emitted from light emitting diode 22 which diverges away from a central longitudinal axis defined by tube 20. Therefore, most light which diverges between source 21 and aperture 26 will be absorbed by liner 29. Light emitting from aperture 28 will diverge but in a very narrow beam.

The light beam pattern emitted from each tube is dependent upon a number of variables. These are:
  the type of infrared light emitting diodes;
  the amount of current passing through the light emitting diodes which affect the infrared radiation intensity;
  the length of each tube; and
  the aperture diameter.

Any change in one or more of these variables will affect the pattern or shape of the output beam.

It was found through experimentation, that a beam pattern such as shown in FIG. 3 could be produced. This beam pattern has a constant minimum intensity with a generally constant diameter at any point within a predefined range.

With each pair of tubes, the light emitting diodes are connected in series.

It was found that the use of three tube pairs in a cluster arrangement such as shown in FIG. 1, in which a first pair of tubes with a length of 2", a second pair of tubes with a length of 5⅜" and a third pair of tubes with a length of 16½" can provide a beam pattern such as shown in FIG. 3. Each tube has an aperture formed by aluminum insert with a ⅜" outer diameter and ¼" long. Each aluminum insert is provided with a center hole having a diameter of 13/64" which forms the light aperture. Each tube has an outer diameter of ½" and an interior diameter of ⅜". Such a cluster arrangement will create and emit, for a range of between 3' and 45', a beam having a constant diameter of about 5½" plus or −0.5".

The long tubes were provided with infrared LED's with 15% ½ intensity beam angle whereas the remaining tubes were provided with infrared LED's with 50% ½ intensity beam angle. The LED's in the long tubes were fed with 750 milliamps of DC current, the medium size tubes were fed with 374 milliamps of DC current and the short tubes were fed with 208 milliamps of DC current.

The infrared receiver used in testing beam shaper had a receiver gain of 35,000.

It was found that an increase in a number of tubes provides a higher quality of the shape of the beam emitted from the beam shaper. It was found that other structural embodiments of the cluster arrangement of FIG. 1 can also be provided. For example, three long tubes can be used along with two medium size tubes and one short tube. Also, three long tubes with two medium range tubes and two short range tubes can be used wherein one long tube is used to replace the center frame tube 11. In addition, although the preferred embodiment consists of a circular cluster of tubes, a rectangular arrangement would also be possible to use.

The light absorbing liner could also comprise a rough surface cloth or a roughened card surface painted with flat black paint.

Although the current beam shaper and projector are adapted for use with an infrared light emitting diode, other types of light emitting diodes such as those operating in the visible and invisible light spectrum can be used as well.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

I claim:
1. A light beam projector, comprising:
  a hollow cylindrical tube;
  a light source positioned at one end within said tube; and
  an aperture located at the opposite end of said tube, said tube having a light absorbing liner extending along said tube from said light source to said aperture, such that most light emitted by said source which diverges away from a central horizontal axis defined by said tube, before said aperture, will be absorbed by said liner and any remaining light centered about said axis will be emitted through said aperture.

2. A beam projector as defined in claim 1 wherein said light absorbing liner is positioned on the interior surface of said tube.

3. A beam projector as defined in claim 2 wherein said aperture is comprised of a hollow cylindrical insert having a predetermined interior diameter forming a light aperture, said insert being adapted to be fixedly mounted at said second end of said tube opposite said first end.

4. A beam projector as defined in claim 3 wherein said light source comprises an infrared light emitting diode.

5. A beam projector as defined in claim 4 wherein said light absorbing liner is comprised of rolled black flock paper.

6. An infrared beam shaper able to emit a beam of infrared light having a specified shape within a predetermined distance, comprising:
  a cluster of hollow cylindrical tubes;
  a source positioned at a first end of each tube; and
  an aperture located at a second end of each tube, opposite its first end, each tube being positioned in said cluster with their apertures located adjacent each other and each tube having a light absorbing liner extending along each tube from said first end to said second end, such that most light emitted by said source which diverges away from a central horizontal axis defined by said tube, before said second end, will be absorbed by said liner and any remaining light will be emitted through said aperture.

7. A beam shaper as defined in claim 6 wherein said cluster is comprised of a series of tubes having varying lengths adapted to emit short, medium and long range light beams such that when combined, the resulting beam has a generally cylindrical shape within a predetermined distance.

8. A beam shaper as defined in claim 7 wherein said tubes are comprised of a first group of tubes adapted to emit a short range beam, a second group of tubes adapted to emit a medium range beam, and a third group of tubes adapted to emit a long range beam, said second group of tubes being longer than said first group but shorter than said third group of tubes.

9. A beam shaper as defined in claim 8 wherein said first, second and third group of tubes is comprised of a first, second and third pair of tubes said tubes being secured together to form a circular cluster of tubes.

10. A beam shaper as defined in claim 9 wherein said cluster of tubes is mounted around a frame tube centrally located in said cluster.

11. A beam shaper as defined in claim 10 wherein each tube in said first, second and third pair is mounted adjacent to each other around said frame tube.

12. A beam shaper as defined in claim 11 wherein said light absorbing liner is positioned on the interior surface of each tube.

13. A beam shaper as defined in claim 12 wherein said aperture is comprised of a hollow cylindrical insert having a predetermined diameter forming a light aperture, said insert being adapted to be fixedly mounted at said second end of each of said tube opposite said first end.

14. A beam shaper as defined in claim 13 wherein said light source comprises infrared light emitting diode.

15. A beam shaper as defined in claim 14 wherein said light absorbing liner is comprised of rolled black flock paper.

16. A light beam projector, comprising:
a hollow cylindrical tube having first and second ends;
a light source positioned at said first end of said tube; and
an aperture located at the second end of said tube, said aperture comprising a hollow cylindrical insert having a predetermined interior diameter forming a light aperture, said insert being adapted to be fixedly mounted at said second end, said tube having a light absorbing liner extending along the interior of said tube from said light source to said aperture, such that most light emitted by said source which diverges away from a central horizontal axis defined by said tube before said aperture will be absorbed by said liner and any remaining light centered about said axis will be emitted through said aperture.

17. A beam projector as defined in claim 16 wherein said light source comprises an infrared light emitting diode.

18. A beam projector as defined in claim 16 wherein said light absorbing liner is comprised of rolled black flock paper.

* * * * *